(12) United States Patent
Kuang et al.

(10) Patent No.: US 8,686,970 B2
(45) Date of Patent: Apr. 1, 2014

(54) TOUCH INPUT ELECTRONIC DEVICE

(75) Inventors: Yu Kuang, Hsinchu (TW); Shih-Tzung Chou, Zhudong Township, Hsinchu County (TW)

(73) Assignee: Raydium Semiconductor Corporation, Hsinchu (TW)

( * ) Notice: Subject to any disclaimer, the term of this patent is extended or adjusted under 35 U.S.C. 154(b) by 373 days.

(21) Appl. No.: 13/033,661

(22) Filed: Feb. 24, 2011

(65) Prior Publication Data

US 2011/0242049 A1    Oct. 6, 2011

(30) Foreign Application Priority Data

Mar. 31, 2010 (TW) ................................. 99109924 A

(51) Int. Cl.
*G06F 3/045* (2006.01)
(52) U.S. Cl.
USPC .......................................................... 345/174
(58) Field of Classification Search
USPC .......................................................... 345/174
See application file for complete search history.

(56) References Cited

U.S. PATENT DOCUMENTS

| 5,825,345 | A  | * | 10/1998 | Takahama et al. | 345/104 |
| 8,456,434 | B2 | * | 6/2013  | Moon et al.     | 345/173 |
| 2009/0095542 | A1 | * | 4/2009 | Moon et al.    | 178/18.06 |
| 2010/0321336 | A1 | * | 12/2010 | Chou et al.   | 345/174 |
| 2011/0210938 | A1 | * | 9/2011  | Kuang et al.  | 345/174 |
| 2012/0098786 | A1 | * | 4/2012  | Kuang         | 345/174 |

* cited by examiner

*Primary Examiner* — Alexander S Beck
*Assistant Examiner* — Mihir Rayan

(57) ABSTRACT

An touch input electronic device includes: a touch input device; a clock generation circuit, generating a first clock and a second clock; a touch sensing circuit, coupled to the touch input device, the touch sensing circuit operated under the first clock; a logic circuit, receiving a sensing output signal from the touch sensing circuit, the logic circuit operated under the second clock; and a conversion circuit, outputting an output voltage under control of the logic circuit, the output voltage coupled to the touch sensing circuit, the conversion circuit operated under the second clock. In response to the sensing output signal from the touch sensing circuit, the logic circuit controls the conversion circuit to adjust the output voltage to detect a capacitance variance of the touch input device.

3 Claims, 5 Drawing Sheets

TOUCH INPUT ELECTRONIC DEVICE

This application claims the benefit of Taiwan application Serial No. 99109924, filed Mar. 31, 2010, the subject matter of which is incorporated herein by reference.

TECHNICAL FIELD

The disclosure relates in general to a touch input electronic device, and more particularly to a touch input electronic device with improved sensing rate.

BACKGROUND

For the convenience of use, the touch panel or the display touch panel (having both display and touch functions), which accepts data/instruction from the user or user's click, is widely used in various electronic devices such as mobile phone. Thus, the user can directly input data/instruction or click on the touch panel or the display touch panel and such operation mode is convenient and friendly to the user. There are a variety of touch panels or display touch panels, such as capacitive touch panel or capacitive display touch panel.

When the user operates a capacitive touch panel, a capacitive display touch panel, or a capacitive switch, the capacitance of the capacitor under test thereof varies. Thus, the user's operation will be detected (sensed) if the capacitance of the capacitor under test and its variance can be detected. The capacitive touch panel detects the position of the touch point according to the capacitance variance of the sensing grid embedded in the touch panel.

FIG. 1A shows a conventional touch panel 10. Referring to FIG. 1A. The touch panel 10 includes a plurality of X-direction wires X1~Xm and a plurality of Y-direction wires Y1~Yn, m and n are both positive integers being identical or different from each other. The X-direction wires and the Y-direction wires are formed in different layers. The X-direction wires and the Y-direction wires are intersected to form a sensing grid. A cross coupling capacitor, (such as the cross coupling capacitor 100a, 100b or 100c in FIG. 1A) is formed at each of the intersection by the X-direction wire and Y-direction wire. Let FIG. 1A be taken for example, the touch panel 10 has m*n cross coupling capacitors in total.

When an object (such as a finger or a stylus) touches the touch panel 10, the coupling relationship between the object and the sensing grid will change capacitances of nearby cross coupling capacitors. A detection circuit can thus detect the location of the touch point according to the capacitance variance of the cross coupling capacitors.

In operation, a driving signal (such as a squared wave, a triangular wave, a cosine wave, and so on) is inputted to the Y (or X) direction wires. Whether the wires are touched is determined by comparing the coupling voltage on the X (or Y) direction wires. However, an RC delay will occur due to the resistance of the direction wires as well as the internal parasitic capacitance of the touch panel. The internal parasitic capacitance includes the GND parasitic capacitance of the direction wire and the cross-coupling capacitance between the direction wires.

FIG. 1B shows an RC delay according to a prior art. In FIG. 1B, a clock signal clk is a driving signal or an operating clock; and another clock signal clk' is the driving signal received by the direction wires on the touch panel. IN(−) and IN(+) are respectively a negative input signal and a positive input signal of a sensing circuit (not illustrated). Due to the RC delay, the driving signal received by a far direction wire takes a longer time to stabilize, so the frequency of the driving signal cannot be too high. As the sensing circuit is under control of the driving signal, the sensing rate is affected and slowed down accordingly.

BRIEF SUMMARY

The disclosure is directed to a touch input electronic device. A slower driving clock for functioning as a driving signal sent to direction wires and a faster sensing clock for controlling a sensing circuit are separated, so the sensing rate is increased.

According to an example aspect of the present disclosure, a touch input electronic device includes a touch input device; a clock generation circuit, generating a first clock and a second clock; a touch sensing circuit coupled to the touch input device and operated under the first clock; a logic circuit, receiving a sensing output signal from the touch sensing circuit and operated under the second clock; and a conversion circuit, outputting an output voltage under control of the logic circuit, the output voltage coupled to the touch sensing circuit and operated under the second clock. In response to the sensing output signal from the touch sensing circuit, the logic circuit controls the conversion circuit to adjust the output voltage to detect a capacitance variance of the touch input device.

It is to be understood that both the foregoing general description and the following detailed description are exemplary and explanatory only and are not restrictive of the disclosed embodiments, as claimed.

DETAILED DESCRIPTION OF THE DISCLOSURE

For a large-sized touch panel, directional wires thereof are longer and the RC delay is more serious. Therefore, in embodiments of the disclosure disclosed below, a driving clock for signal driving and a sensing clock for controlling a sensing circuit are separated. Within 1 or 2 cycles of the driving signal, the sensing clock has two frequencies. The sensing clock in the first one or two sensing cycles has lower frequency for waiting the driving signal on the direction wires of the touch panel to be stabilized; and the sensing clock in other sensing cycles has higher frequency for waiting an output voltage of DAC (digital-to-analog conversion circuit) to be stabilized. In general, the DAC has small output coupling capacitances (below 5 pF), so the time for the output voltage of the DAC to be stabilized is short. Thus, the sensing rate of the embodiments of the disclosure may be increased.

First Embodiment

Figure 1A:
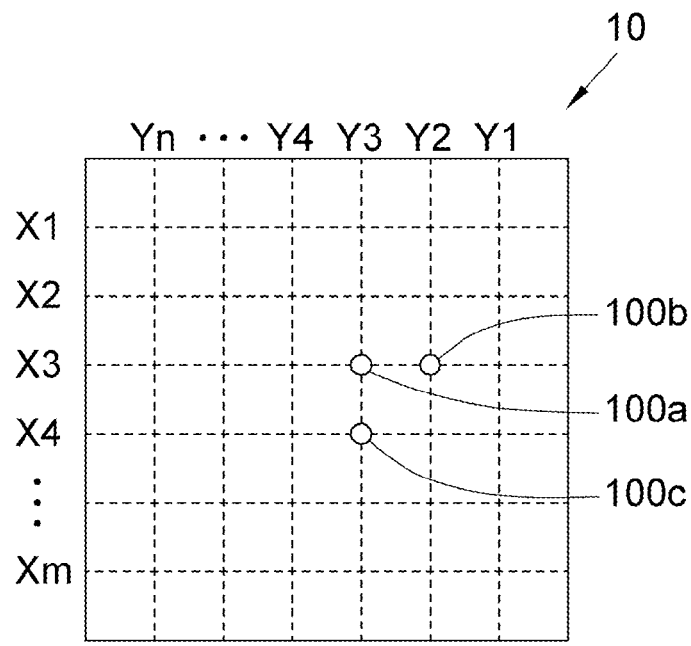
FIG. 1A shows a conventional touch panel.
Figure 1B:
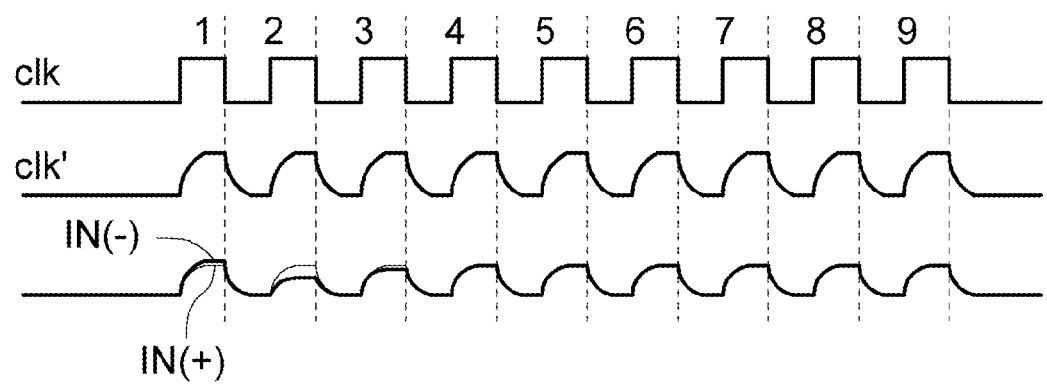
FIG. 1B shows an RC delay according to a prior art.
Figure 2:
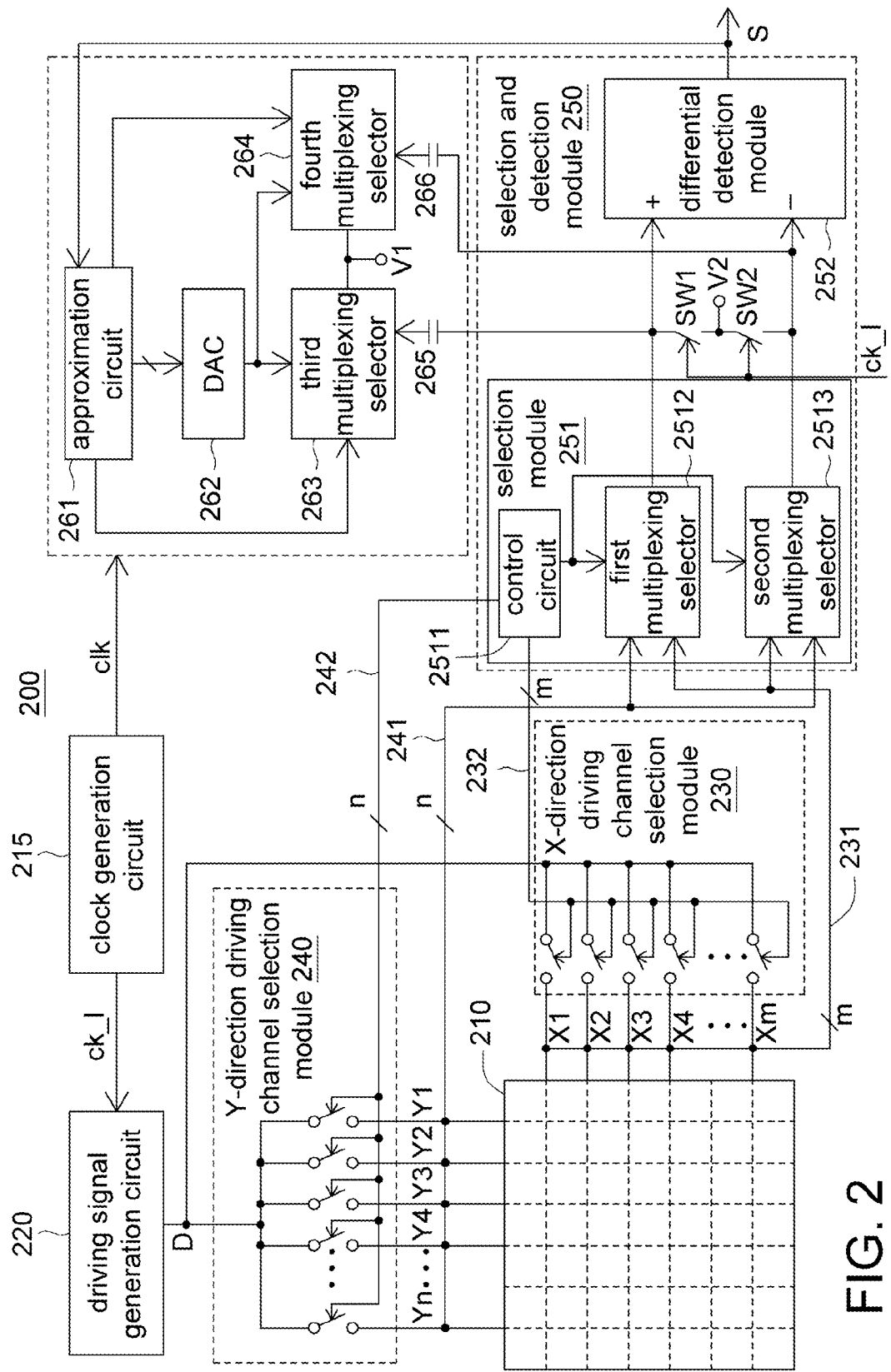
FIG. 2 shows an electronic device according to a first embodiment of the disclosure.

FIG. 2 shows an electronic device according to a first embodiment of the disclosure. As indicated in FIG. 2, the electronic device 200 includes a touch panel 210, a clock generation circuit 215, a driving signal generation circuit 220, an X-direction driving channel selection module 230, a Y-direction driving channel selection module 240, a selection and detection module 250, an approximation circuit 261, a digital-to-analog conversion circuit (DAC) 262, a third multiplexing selector 263, a fourth multiplexing selector 264, coupling capacitors 265~266 and switches SW1~SW2.

Figure 3:
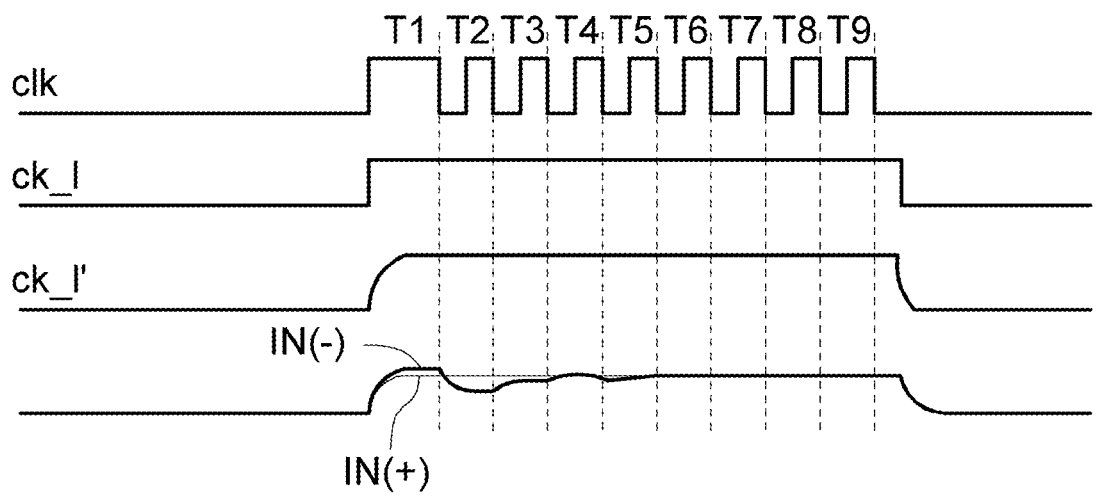
FIG. 3 shows a signal timing diagram according to the first embodiment of the disclosure.

The clock generation circuit 215 generates two different clocks clk and ck_I as indicated in FIG. 3. The clock clk is inputted to the approximation circuit 261, the DAC 262, the third multiplexing selector 263 and the fourth multiplexing selector 264 and used as an operating clock thereof. The clock ck_I is inputted to other circuits and used as an operating clock thereof. IN(+) and IN(−) are respectively a positive input voltage and a negative input voltage of the differential detection module 252.

The driving signal generation circuit 220 generate a driving signal D to the X-direction wires X1~Xm and the Y-direction wires Y1~Yn according to the clock ck_I. Further, the driving signal D may be identical to the clock ck_I. The driving signal D is for example but not limited to a squared wave, a triangular wave, and a cosine wave and the like. Within a cycle of the driving signal D (or the clock ck_I), the capacitance detection may be completed.

The X-direction driving channel selection module 230 includes m switches, each controlled by a respective control signal generated by a control circuit 2511. The m control signals are inputted to the respective switches via the signal line 232. The m switches are coupled between the driving signal generation circuit 220 and the respective corresponding X-direction wires X1~Xm. The coupling voltages of the X-direction wires X1~Xm are respectively inputted to the selection and detection module 250 via the signal line 231.

The Y-direction driving channel selection module 240 includes n switches, each controlled by a respective control signal generated by the control circuit 2511. The n control signals are respectively inputted to the respective switches via the signal line 242. The n switches are coupled between the driving signal generation circuit 220 and the respective corresponding Y-direction wires Y1~Yn. The coupling voltages of the Y-direction wires Y1~Yn are respectively inputted to the selection and detection module 250 via the signal line 241.

The selection and detection module 250 includes a selection module 251 and a differential detection module 252. The selection module 251 includes the control circuit 2511, a first multiplexing selector 2512 and a second multiplexing selector 2513.

The operations of the first embodiment are disclosed below. In sensing, the Y-direction or the X-direction channel selection module determines which direction wire (a direction wire also referred as a channel), for example the channel Y1, to receive the driving signal. The control circuit 2511 controls the first multiplexing selector 2512 and the second multiplexing selector 2513 to select two channels (such as the channels X1 and X2) respectively connected to the positive input end and the negative input end of the differential detection module 252.

The voltage of the driving signal is divided by the cross-coupling capacitor formed between the Y-direction wire and the X-direction wire, and the voltage-divided driving signal is coupled to the two wires respectively connected to the positive input end and the negative input end of the differential detection module 252. The differential detection module 252 may be a voltage comparator. The output of the differential detection module 252 controls the approximation circuit 261. The approximation circuit 261 may be a control logic circuit, such as a successive approximation register (SAR) circuit, but is not limited thereto. The output signal of the approximation circuit 261 controls the DAC 262, and adjusts the output voltage of the DAC bit by bit. The output voltage of the DAC is coupled to the positive input end or the negative input end of the differential detection module 252, according to the clock clk through a coupling capacitor effect. Thus, the positive input voltage and the negative input voltage of the differential detection module 252 may gradually become equal or almost equal, so that the capacitance variance of the touch panel 210 caused by an object touch may be detected.

An example is exemplified below. However, the embodiment of the disclosure is not limited thereto. Suppose the Y-direction driving channel selection module 240 selects the Y-direction wires Y1~Yn as the driving channels, and connects the Y-direction wires Y1~Yn to the driving signal generation circuit 220. The X-direction driving channel selection module 230 selects the X-direction wires X1 and X2 to be respectively connected to the positive input end and the negative input end of the differential detection module 252 via the first and the second multiplexing selectors.

The clock ck_I (or the driving signal D) is indicated in FIG. 3. In FIG. 3, the clock ck_I' is the driving signal received by the direction wire. When the clock ck_I is at logic low, the switches SW1 and SW2 are turned on for connecting the positive input end and the negative input end of the differential detection module 252 to a voltage V2 (a fixed voltage source for example but not limited to 0V) and vice versa. In FIG. 3, a timing length of the first cycle (T1) of the clock clk is determined according to the RC delay timing of the touch panel. The clocks clk has 9 cycles T1~T9.

In the first cycle T1 of the clock clk, the one upper end (which is coupled to the third multiplexing selector) of the coupling capacitor 265 and the one upper end (which is coupled to the forth multiplexing selector) of the coupling capacitor 266 may be connected to a fixed voltage source V1 (such as VCC) via the third multiplexing selector 263 and the fourth multiplexing selector 264. Meanwhile, the driving signal is coupled to two wires (such as the X-direction wires X1 and X2) respectively connected to the positive input end and the negative input end of the differential detection module 252 by the cross-coupling capacitor formed between the Y-direction wires and the X-direction wires. If the X-direction wire X1 is touched, the coupling capacitance between the X-direction wire X1 and the Y-direction wire becomes smaller, so that the coupling voltage on the X-direction wire X1 also becomes smaller. Thus, the positive input voltage of the differential detection module 252 is smaller than the negative input voltage, as shown in T1 of FIG. 3, so that the output signal S of the differential detection module 252 is 0. At the falling edge of the first cycle T1 of the clock clk, the approximation circuit 261 locks the output signal S as a most significant bit (MSB) of the capacitance variance (in digital format).

In response to the output signal, in the second cycle T2, the output analog voltage of the DAC may be changed (smaller or higher) under control of the approximation circuit. For example, in the cycle T1, one upper end (which is coupled to the fourth multiplexing selector) of the coupling capacitor 266 is connected to VCC. In the cycle T2, since the output signal S is logic 0, the output analog voltage of the DAC is down to VCC/2 from VCC, making the voltage at the upper end of the coupling capacitor 266 smaller. The negative voltage change is coupled to the negative input end of the differential detection module 252 via the coupling capacitor 266.

After coupling, if the negative input voltage of the differential detection module 252 is lower than the positive input voltage of the differential detection module 252, then the differential detection module 252 outputs 1. The approximation circuit 261 locks the "1" signal at the second falling edge of the clock clk as the second significant bit of the capacitance variance.

Since the output signal S is logic 1, in the cycle T3, the output voltage of the DAC is boosted to VCC*3/4 under control of the approximation circuit 261. Thus, the voltage at the upper end of the coupling capacitor 266 changes to VCC*3/4 from VCC/2. By the coupling capacitor effect, the positive voltage change at the upper end of the coupling capacitor 266 may be coupled to the negative input end of the differential detection module 252. After coupling, the differential detection module 252 compares the negative input voltage and the positive input voltage to output the signal S. The approximation circuit 261 locks the signal S as the third significant bit of the capacitance variance.

Thus, bits (for example 9 bits in FIG. 3) of the capacitance variance are sequentially encoded. In the embodiment of the disclosure, after 9 clock cycles, the detection of the capacitance variance caused by touch is completed and the position of the touch point is detected accordingly.

As indicated in FIG. 3, in detection of the capacitance variance, the clock ck_I with lower frequency is triggered once. To the contrary, the clock clk with higher frequency is triggered several times. The clock clk has lower frequency in the first cycle T1 (which is for waiting the driving signal on the direction wires of the touch panel to stabilize) than other cycles T2~T9, the cycles T2~T9 for waiting for the output voltage of the DAC to stabilize.

Second Embodiment

Figure 4:
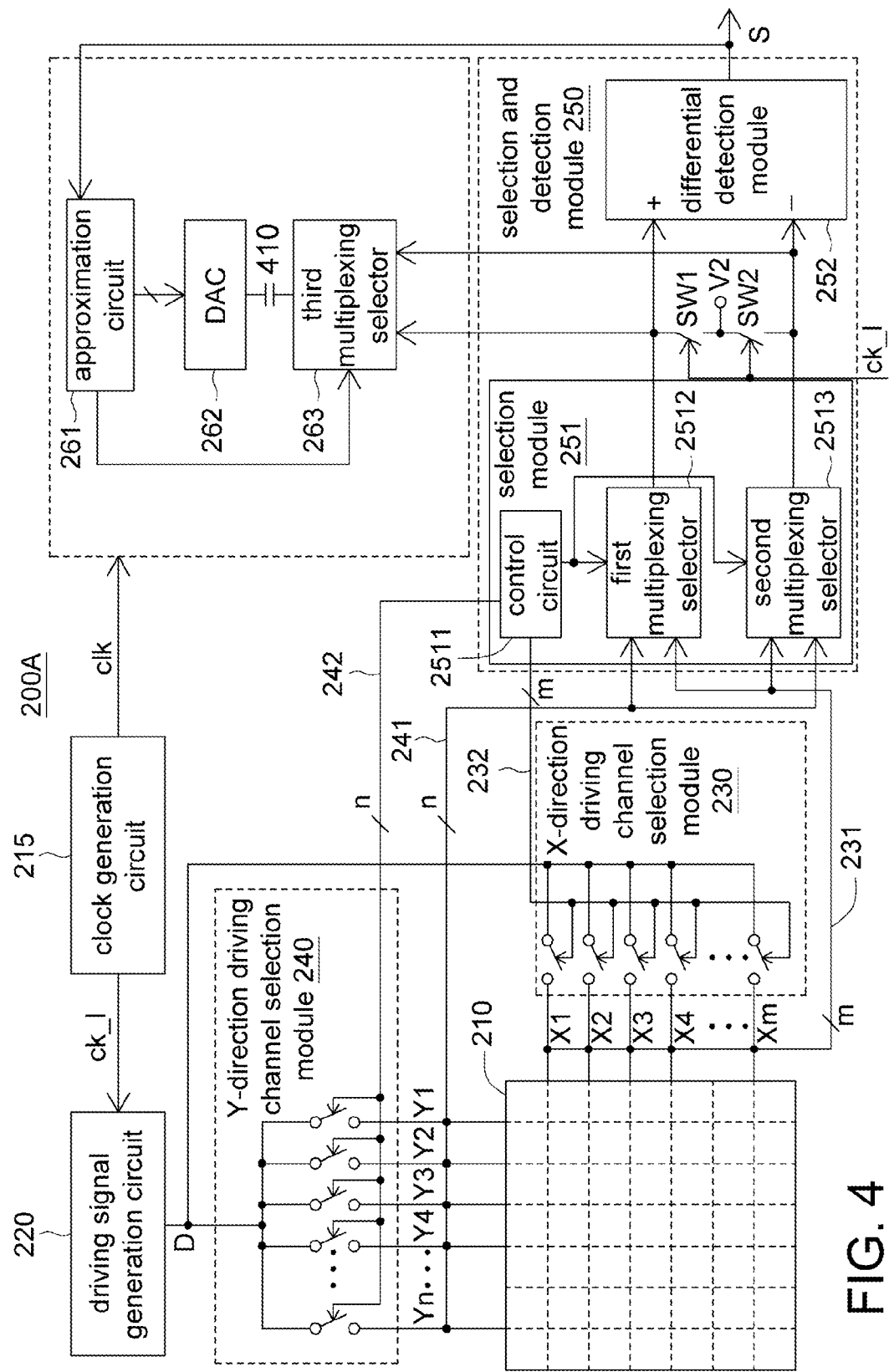
FIG. 4 shows an electronic device according to a second embodiment of the disclosure.
Figure 5:
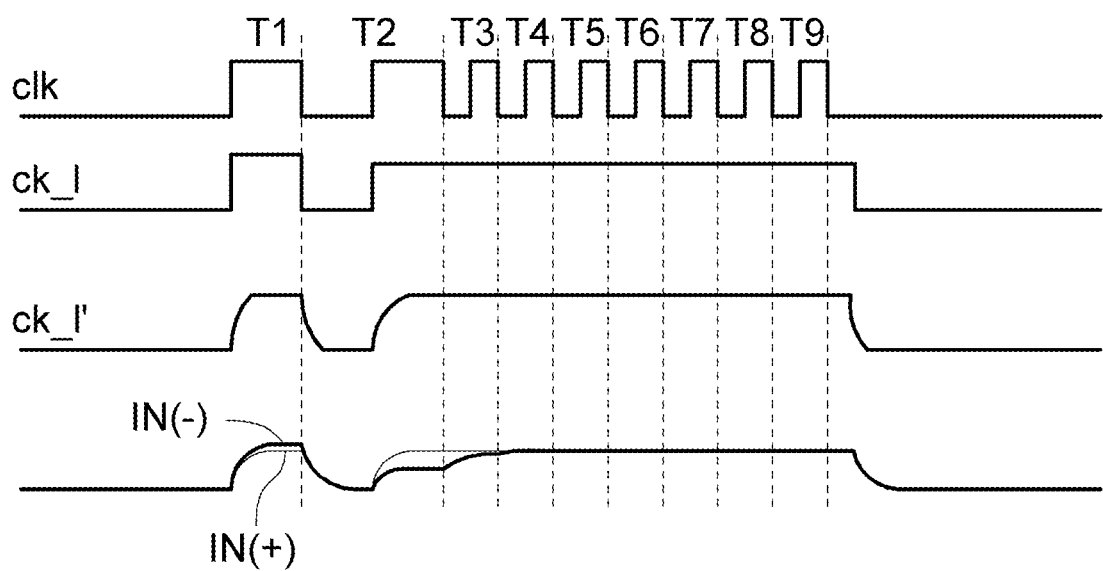
FIG. 5 shows a signal timing diagram according to the second embodiment of the disclosure.

FIG. 4 shows an electronic device 200A according to a second embodiment of the disclosure. Most of the second embodiment of the disclosure is identical to or similar with the first embodiment. As indicated in FIG. 4, a coupling capacitor 410 is coupled between the DAC 262 and the third multiplexing selector 263. FIG. 5 shows a signal timing diagram according to the second embodiment of the disclosure.

The operations of the second embodiment are disclosed below. As indicated in FIG. 5, the clock clk has lower frequency in the first two cycles T1 and T2. In the cycle T1, the driving signal D (or the clock ck_I) is triggered, so that the coupling voltage is sent from the direction wire to the differential detection module 252 and the differential detection module 252 determines which of the positive input voltage and the negative input voltage is larger. The third multiplexing selector will not connect any of the positive input end and the negative input end of the differential detection module to the lower end of the coupling capacitance 410. Also, according to the output signal S, the approximation circuit 261 may determine whether the capacitor 410 will be coupled to the positive input end or the negative input end of the differential detection module 252 via the third multiplexing selector 263 in or after the cycle T2. The timing length of the cycle T2 is determined according to the time for the driving signal received by the wire of the touch panel 210 required to be stabilized.

The clock signal clk has higher frequency in the cycles T3~T9. At the falling edge of the cycle T1, the approximation circuit 261 locks the output signal S of the differential detection module 252 as the most significant bit (MSB) of the capacitance variance. In the cycle T2, the approximation circuit 261 controls the third multiplexing selector 263 to connect one of the positive input end and the negative input end of the differential detection module 252 to the lower end of the coupling capacitor 410 according to the locked output signal S. Let the timing diagram of FIG. 5 be taken for example. The negative input end of the differential detection module 252 is connected to the lower end of the coupling capacitor 410.

In the logic low period of the cycle T2, the output voltage of the DAC is VCC. In the logic high period of the cycle T2, the output voltage of the DAC is changed to VCC/2. The voltage change causes a negative voltage change to the upper end of the capacitor 410, which is further coupled to the negative input end of the differential detection module 252. After voltage coupling, if the negative input voltage of the differential detection module 252 is lower than the positive input voltage of the differential detection module 252, then the output signal S of the differential detection module is "1", and the approximation circuit 261 locks the output signal "1" at the second falling edge of the clock clk as the second significant bit of the capacitance variance.

Under control of the approximation circuit 261, the output voltage of the DAC is boosted to VCC*3/4, making the upper end voltage of the capacitor 410 boosted to VCC*3/4 from VCC/2. The boost voltage change is coupled to the negative input end of the differential detection module 252 by the capacitor coupling effect. The differential detection module 252 compares the negative input voltage and the positive input voltage to output the signal S. The approximation circuit 261 locks the output signal S at the falling edge of the clock as the third significant bit of the capacitance variance.

Thus, the bits of the capacitance variance (for example, 9 bits shown in FIG. 3) are sequentially encoded. In the present embodiment of the disclosure, after 9 clock cycles, the detection of the capacitance variance caused by touch is completed so as to detect the position of the touch point.

In the above two embodiments, the initial output voltage of the DAC is VCC, and the higher one of the negative input voltage and the positive input voltage of the differential detection module 252 is adjusted. In other possible embodiments of the disclosure, the initial output voltage of the DAC may be GND, and the lower one of the negative input voltage and the positive input voltage of the differential detection module 252 may be adjusted.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. An electronic device, comprising:
   a touch input device;
   a clock generation circuit, generating a first clock and a second clock;
   a touch sensing circuit, coupled to the touch input device and operated under the first clock;
   a logic circuit, receiving a sensing output signal from the touch sensing circuit and operated under the second clock; and
   a conversion circuit, outputting an output voltage under control of the logic circuit, the output voltage coupled to the touch sensing circuit, the conversion circuit operated under the second clock;
   wherein in response to the sensing output signal from the touch sensing circuit, the logic circuit controls the conversion circuit to adjust the output voltage to detect a capacitance variance of the touch input device;
   wherein within a cycle of the first clock, the touch sensing circuit detects the capacitance variance; and wherein, the clock generation circuit determines a timing length of a first cycle of the second clock according to a resistor capacitor delay time of the touch input device.

2. An electronic device, comprising:
a touch input device;
a clock generation circuit, generating a first clock and a second clock;
a touch sensing circuit, coupled to the touch input device and operated under the first clock;
a logic circuit, receiving a sensing output signal from the touch sensing circuit and operated under the second clock;
a conversion circuit, outputting an output voltage under control of the logic circuit, the output voltage coupled to the touch sensing circuit, the conversion circuit operated under the second clock; and
a first selector, under control of the logic circuit, determining whether to couple the output voltage of the conversion circuit to the touch sensing circuit, the first selector operated under the second clock;
a first coupling capacitor coupled between the first selector and the touch sensing circuit;
a second selector, under control of the logic circuit, determining whether to couple the output voltage of the conversion circuit to the touch sensing circuit, the second selector operated under the second clock; and
a second coupling capacitor coupled between the second selector and the touch sensing circuit
wherein in response to the sensing output signal from the touch sensing circuit, the logic circuit controls the conversion circuit to adjust the output voltage to detect a capacitance variance of the touch input device;
wherein within a cycle of the first clock, the touch sensing circuit detects the capacitance variance.

3. An electronic device, comprising:
a touch input device;
a clock generation circuit, generating a first clock and a second clock;
a touch sensing circuit, coupled to the touch input device and operated under the first clock;
a logic circuit, receiving a sensing output signal from the touch sensing circuit and operated under the second clock; and
a conversion circuit, outputting an output voltage under control of the logic circuit, the output voltage coupled to the touch sensing circuit, the conversion circuit operated under the second clock;
wherein in response to the sensing output signal from the touch sensing circuit, the logic circuit controls the conversion circuit to adjust the output voltage to detect a capacitance variance of the touch input device;
wherein within a cycle of the first clock, the touch sensing circuit detects the capacitance variance; and
wherein, after a second cycle of the second clock, in response to the sensing output signal from the touch sensing circuit, the logic circuit bit-by-bit controls the conversion circuit to adjust the output voltage, and bit-by-bit locks the sensing output signal from the touch sensing circuit to bit-by-bit obtain the capacitance variance.

* * * * *